United States Patent
Oku et al.

(10) Patent No.: US 8,974,980 B2
(45) Date of Patent: Mar. 10, 2015

(54) FUEL CELL

(75) Inventors: Takanori Oku, Yokohama (JP);
Mitsutaka Abe, Yokohama (JP);
Shigetaka Uehara, Kamakura (JP);
Yasuhiro Numao, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/701,090

(22) PCT Filed: May 31, 2011

(86) PCT No.: PCT/JP2011/062500
§ 371 (c)(1),
(2), (4) Date: Jan. 24, 2013

(87) PCT Pub. No.: WO2011/152405
PCT Pub. Date: Dec. 8, 2011

(65) Prior Publication Data
US 2013/0115541 A1    May 9, 2013

(30) Foreign Application Priority Data
Jun. 1, 2010   (JP) ................. 2010-125733

(51) Int. Cl.
*H01M 8/10*   (2006.01)
*H01M 8/24*   (2006.01)
*H01M 8/02*   (2006.01)

(52) U.S. Cl.
CPC ............ *H01M 8/1004* (2013.01); *Y02E 60/521* (2013.01); *H01M 8/10* (2013.01); *H01M 8/24* (2013.01); *H01M 8/02* (2013.01)
USPC ............ 429/458; 429/459; 429/460; 429/483

(58) Field of Classification Search
USPC ......................... 429/458–461, 463, 482–483
See application file for complete search history.

(56) References Cited

U.S. PATENT DOCUMENTS

| | | | |
|---|---|---|---|
| 2002/0102453 A1 | 8/2002 | Suenaga et al. | |
| 2003/0087142 A1* | 5/2003 | Kobayashi et al. | 429/30 |
| 2009/0004540 A1* | 1/2009 | Shizuku et al. | 429/35 |
| 2009/0202884 A1* | 8/2009 | Morimoto et al. | 429/30 |
| 2009/0226782 A1 | 9/2009 | Morimoto et al. | |

FOREIGN PATENT DOCUMENTS

| | | |
|---|---|---|
| CN | 101375445 A | 2/2009 |
| CN | 101542799 A | 9/2009 |
| JP | 5-234606 | 9/1993 |
| JP | 10-199551 | 7/1998 |
| JP | 2002-305006 A | 10/2002 |

(Continued)

*Primary Examiner* — Ula C. Ruddock
*Assistant Examiner* — Osei Amponsah
(74) *Attorney, Agent, or Firm* — Young Basile

(57) ABSTRACT

A fuel cell is provided with a membrane electrode assembly provided with a frame, both of which are sandwiched between two separators. The fuel cell is configured such that reactive gas is circulated between the frame and the separators. The frame and both separators each have manifold holes, the rims of the manifold holes of frame extend into the manifold holes in the separators, and protrusions cover the inner peripheral surfaces of the manifold holes in at least one of the separators. This structure makes possible the easy and accurate position and integration of the separators and the frame, and fuel cell miniaturization can be achieved because space to position the protrusions is not needed.

13 Claims, 10 Drawing Sheets

(56) References Cited

FOREIGN PATENT DOCUMENTS

| JP | 2008-034156 A | 2/2008 |
| JP | 2009-016067 A | 1/2009 |
| WO | 2007-123191 | 11/2007 |

* cited by examiner

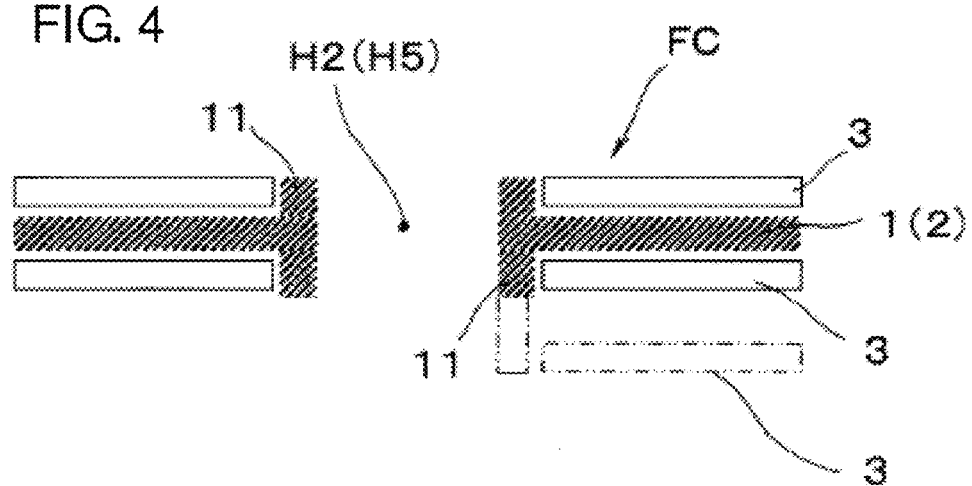
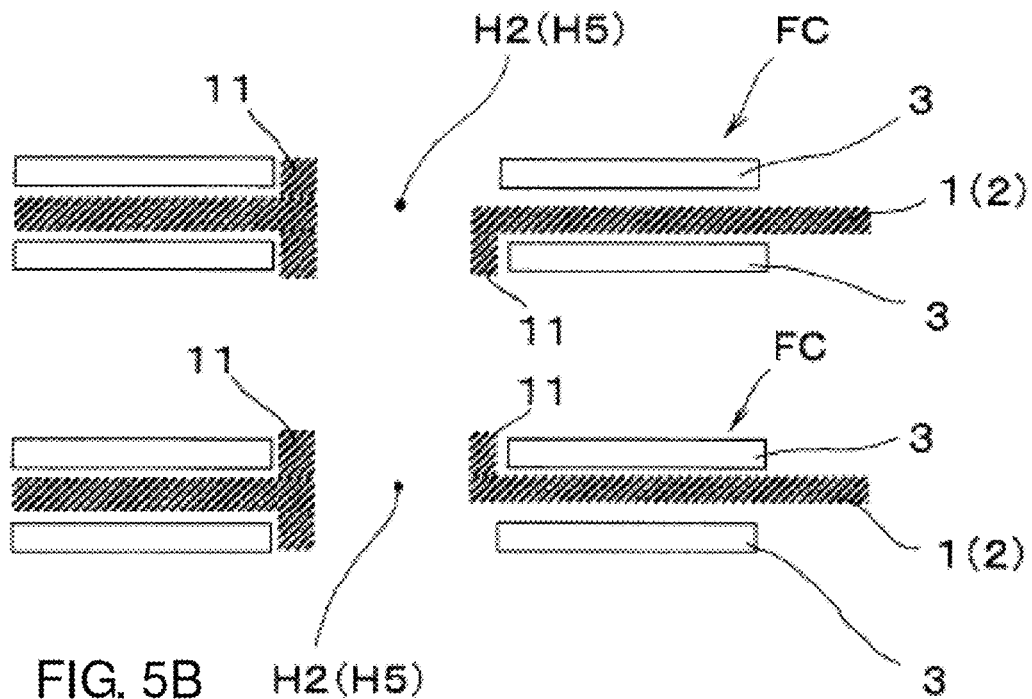

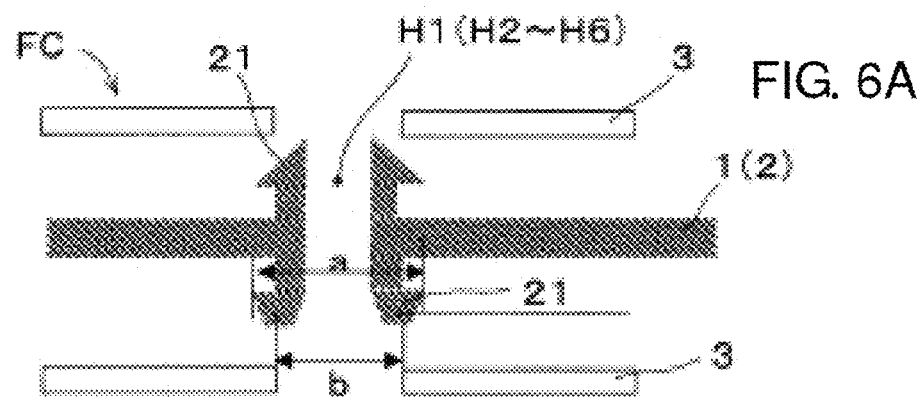
FIG. 6A
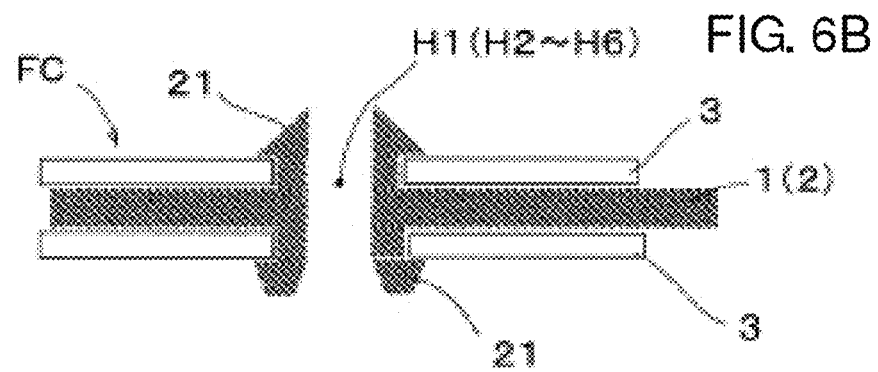
FIG. 6B
FIG. 7
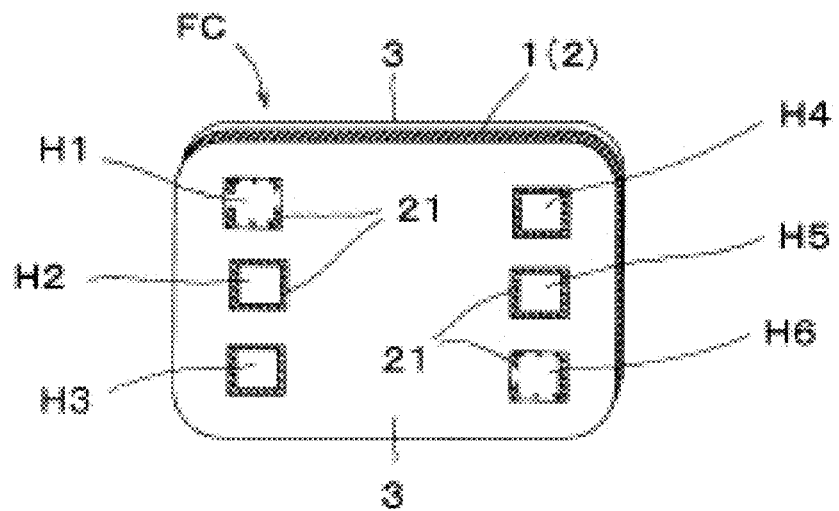

FUEL CELL

TECHNICAL FIELD

The present invention relates to a fuel cell used as a fuel cell power generating element, in particular, the present invention relates to a fuel cell that makes up a fuel cell stack by stacking a plurality of such cells.

BACKGROUND

The fuel cell described in WO2007-123191 is provided with a membrane-electrode-assembly (MEA) integrating a frame body and a pair of separators sandwiching the MEA. In addition, at several locations on the frame body, projections with a hook-shaped tip are provided while at several locations on the separators, step portions are provided. By engaging respective projections with associated step portions, the frame-integrated type MEA and the pair of separators are united or integrated.

However, in the fuel cell of such prior art described above, since as a configuration in which the frame-integrated MEA and a pair of separators are united, a plurality of projections along with step portions are provided, a space for these placements are required, which would be a disadvantage for the miniaturization or reduction in size of the fuel cell.

BRIEF SUMMARY

The present invention has been made focusing on the problems of the above-mentioned conventional technology and is intended to provide a fuel cell with a MEA having a frame body around its periphery and two sheets of separators sandwiching the frame and the MEA that may realize the miniaturization of the fuel cell.

A fuel cell according to the present invention is provided with a membrane-electrode-assembly (MEA) having a frame body around its periphery and a pair of separators sandwiching the frame and MEA along with a structure for circulating reactant gas between the frame and the separators. In addition, both the frame and separators are provided with a manifold hole opening into both sides. Moreover, in the fuel cell, the peripheral portion of the manifold hole of the frame body extends or projects into the inside of the manifold hole of the separator to be configured to cover an inner periphery surface of the manifold hole of at least one of the separators. In a more preferable embodiment, the periphery portion of the manifold hole on the frame is configured to provide a projection that covers an inner periphery surface of the manifold hole on at least one of the separators thereby solving the problems of the conventional technology.

According to the fuel cell of the present invention, a pair of separators may be easily and reliably positioned relative to the frame and MEA by a periphery portion of manifold hole associated with frame body and these may be integrated eventually. Moreover, according to the described fuel cell, the space for the space for placing a protrusion for positioning is not required, it is possible to realize the miniaturization of the fuel cell.

BRIEF DESCRIPTION OF THE DRAWINGS

The description herein makes reference to the accompanying drawings wherein like reference numerals refer to like parts throughout the several views, and wherein:

FIG. 4 is a cross-sectional view for explaining the projection of the fuel cell

FIGS. 5A and 5B show respective cross-sectional views illustrating another embodiment of the positioning projections.

FIGS. 6A and 6B show still another embodiment of the projection in a disassembled state and an assembled state, respectively.

FIG. 7 is a perspective view of the projection shown in FIG. 6B.

DETAILED DESCRIPTION OF EMBODIMENTS

Figure 1:
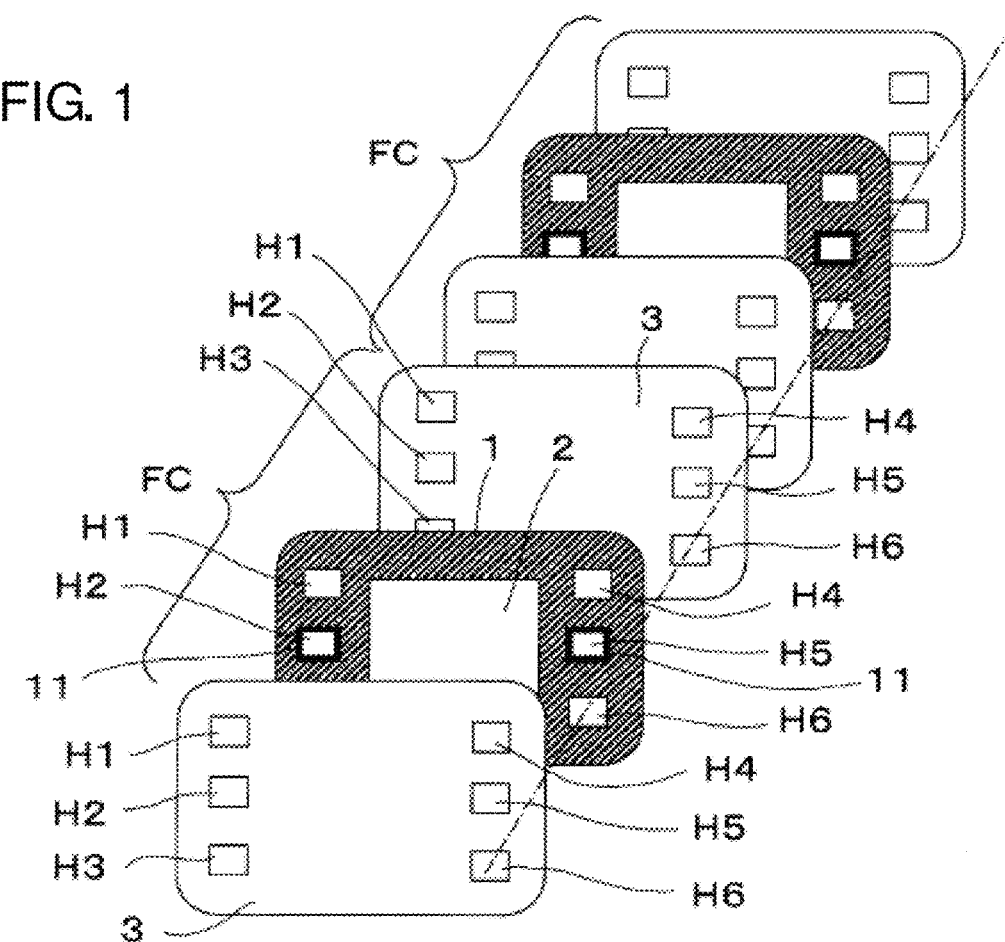
FIG. 1 is a plan view in a disassembled state to explain an embodiment of the embodiment according to the present invention.

Now, with reference to the drawings, a description of an embodiment of the fuel cell according to the present invention will be made. It should be noted that, for the convenience of explanation, the up and down direction of the drawing corresponds to a stacking direction of the fuel cell, and the anode side of the MEA is defined as an upper side while the cathode side is defined as a lower side. In practice, however, the anode side and the cathode side may be reversed, and the stacking direction is also not limited to the up and down direction.

Figure 2:
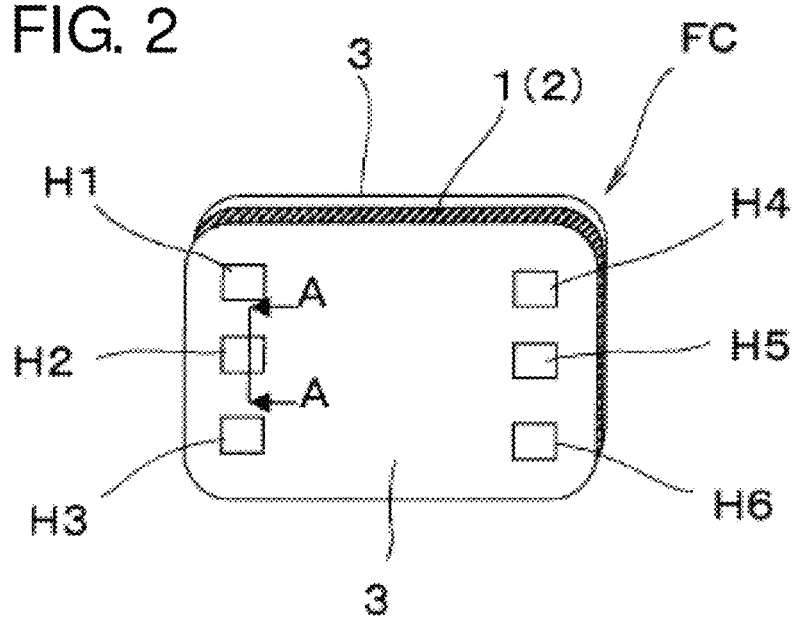
FIG. 2 is a perspective view of a fuel cell.
Figure 3:
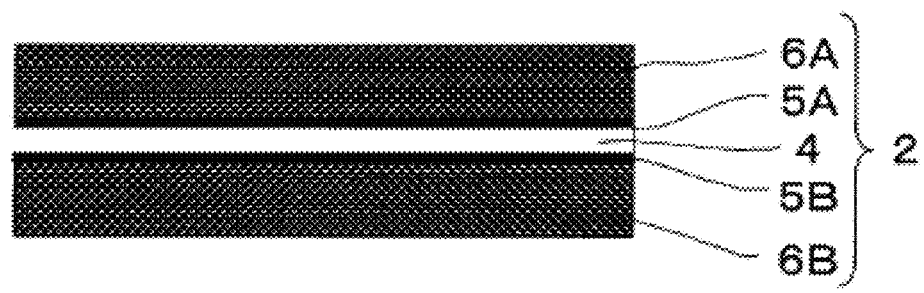
FIG. 3 is a cross-sectional view based on the line A-A in FIG. 2.

The fuel cell shown in FIGS. 1 to 3 has a membrane-electrode-assembly (MEA) structure 2 having a frame 1 around its periphery and a pair of sheets of separators 3, 3. In addition, a structure is provided to distribute or circulate reactant gas between frame 1 and separator 3, 3.

In addition, although the projection 11 may be provided on at least a portion of the periphery of the manifold hole, if provided around the entire periphery of the manifold hole, when structuring the fuel cell stack, a continuous flow passage is formed in the stacking direction. In this case, as shown in FIG. 5A, a part of upper side may be omitted, or, as shown in FIG. 5B, a part of lower side may be removed.

The film or membrane structure 2 is generally called MEA (Membrane Electrode Assembly) and is configured as shown in particular in FIG. 3 to have an electrolyte layer consisting of, for example, solid polymer sandwiched between the fuel electrode layer (anode) 5A and an air electrode layer (cathode) 5B. In addition, the MEA 2 shown has on each surface of fuel electrode layer 5A and air electrode layer 5B a gas diffusion layer 6A, 6B, respectively, consisting of carbon paper or porous material.

Also, in the MEA 2, the fuel electrode layer 5A is supplied with fuel gas (hydrogen) while air electrode layer 5B is supplied with another reactant oxidant gas (air) to cause a power generation by electrochemical reaction. The MEA may omit the gas diffusion layer so as to be consisting of an electrolyte layer 4, fuel electrode layer 5A and air electrode layer 5B.

The frame 1 is integrated with the MEA 2 by way of a resin molding (injection molding, for example). In this embodiment, the membrane electrode structure 2 is placed in the center with a rectangular shape. In addition, frame 1 is formed, at both end portions, respectively with three manifold holes H1 to H6 opening into both sides. In areas ranging from each manifold hole through the membrane electrode structure 2 present a distribution or circulation area of reactant gas. The frame 1 and both separators 3, 3 are in a rectangular shape with approximately the same longitudinal and width dimensions.

Each separator 3 is made of press-formed metal plate such as stainless steel, and is configured such that the central part corresponding to the MEA 2 is formed in waveform or corrugated shape in a cross section along the short-side direction. The corrugated shape is continuous in the direction of long side. Thus, each separator 3 has each protruding or convex portion in contact with MEA 2 and each concave portion forms a flow path of reactant gas.

In addition, each separator 3 has, at both ends, manifold holes H1 to H6 similarly to each manifold hole H1 to H6 on frame 1 with opening into both sides. The area extending between each group of manifold holes to the corrugated cross sectional portion is an area for reactant gas distribution area.

The above mentioned frame 1, MEA 2 and both separators 3,3, when overlaid or laminated, makes up a fuel cell FC. At this time, fuel cell FC has a power generation unit in the center corresponding to the MEA 2. On both sides of the power generation unit is provided both a manifold portion to supply a discharge reactant gas and a diffuser portion for distribution area of reactant gas from each manifold portion to the power generation unit.

The one group of manifold holes shown on the left side of FIG. 2 (H1~H3) are associated for a fuel gas supply (H1), cooling fluid supply (H2), and oxidant gas supply (H3), respectively and, when stacked, these holes form a flow path for fluid to communicate with each other. The other group of manifold holes shown on the right side of FIG. 2 (H4~H6), are dedicated for a fuel gas discharge (H4), cooling fluid discharge (H5), and oxidant gas discharge (H6) respectively and when stacked form a flow path for fluid to communicate with each other. In addition, regarding the holes for the supply and discharge, some or all may be located in the reversed position.

In addition, the fuel cell FC has a gas seal is interposed between the frames 1 and both separators 3. In other words, in the fuel cell FC, the edges of the frame 1 and both separators 3 are sealed with adhesive B. In addition, the fuel cell FC, when laminating multiple fuel cells, can be configured to make up a fuel cell stack. When laminating or stacking, the neighboring separators are also sealed by adhesive B. According to the present embodiment, a structure is disclosed to distribute the cooling fluid between adjacent separators 3, 3.

In the gas sealing by the adhesive of the above, between individual layers, respective communication areas such as for fuel gas, oxidant gas, and cooling fluid are sealed and separated from each other. In other words, in the embodiment shown in FIG. 1, the upper side of lower separator 3 (and the underside of the frame) is provided with a seal line for communicating oxidant gas through air electrode 5B of the MEA 2. Moreover, on upper side of frame 1 (and lower side of the upper separator) is provided with a seal line for allowing oxidant gas to communicate with air electrode 5B of MEA 2. Still further, on upper side of frame 1 (and low side of upper separator), a seal line is provided for allowing fuel gas to communicate with fuel electrode 5 of MEA 2. Finally, on upper side of upper separator 3 is provided with a seal line for communicating cooling fluid.

Here, in the above described fuel cell FC, as a structure to unite or integrate MEA 2 with frame 1 and both separators 3, 3, the periphery portions of manifolds H2, H5 of frame 1 is configured to extend into an inner side of the manifold holes H2, H5 provided in separator 3, further to cover the manifold holes H2, H5 of at least one of the separators 3.

More specifically, as shown in FIG. 1, the manifold holds H2, H5 on frame 1 has in at least portion thereof a positioning projection 11 for engagement with the manifold holes H2, H5 of the same position on the part of separator 3.

In FIG. 1, an example is shown in which the above mentioned projection 11 is provided on the entire periphery around the manifold holes H2, H5 for supply and discharge of cooling fluid. The projection 11 may be provided selectively for each manifold hole H1 to H6, or instead, may be provided to all the manifold holes.

The projection 11 extends or protrudes, as shown in FIG. 4, toward both the separators 3, 3 and its tip is engaged with the periphery (inner peripheral portion) of manifold holes H2, H5 of each separator 3. Thus, both separators 3, 3 may be easily and reliably positioned with respect to frame 1 and MEA 2.

In addition, by providing for the above mentioned projection 11 around the periphery of manifold holes H2, H5 of frame 1, there is no need for such space of margin to place the projection 11 for positioning, and moreover, no special configuration dedicated to positioning will be required. This makes it possible to achieve miniaturization of fuel cell and reduction of man-hours as well as to realize overall weight reduction with size reduction of fuel cell stack and fuel cell vehicle while improving production efficiency.

In addition, in the cell FC fuel cell of this embodiment, since the frame is made of a molded resin, during the molding, the projection 11 may be integrally formed with frame 1. Therefore, as shown in FIG. 4, in the configuration in which projections 11 are provided for engagement with separators 3, 3 on both sides, the projections 11 act as an insulator and prevent an electrical short circuit between the separators 3, 3. In other words, even if the entire cell expands or contracts due to swelling of the membrane electrode structure 2, it is possible to continue to cover the end face of the separator 3, 3 to avoid a short circuit. Also, since the periphery of the manifold holes H1~H6 are protected by projection 11, it is possible to suppress corrosion rate of the inner periphery to contribute to the improvement in durability and reliability of fuel cell and fuel cell stack.

In this way, in the cell FC fuel cell described above, by the configuration of periphery portion of manifold holes H1 to H6 of frame 1, i.e., the periphery portion extending into inside of the manifold holes H2, H5 of separator 3 to cover the inner periphery surface of the manifold holes thereof, more specifically the periphery portion including a projection 11 covering inner periphery of manifold holes H2, H5, both the positioning function of separators 3, 3 relative to frame 1 and MEA 2 and the function of electrical insulator may be fulfilled. Therefore, in a small sized fuel cell stack for a mobile vehicle with more than a few hundreds of cell being stacked, the present configuration is to contribute greatly to the further miniaturization of the same stack. Therefore, a fuel cell using the present fuel cell FC may be very suitable for mounting on an automobile or the like where mounting space is limited.

Regarding the positioning projection 11, as shown in phantom lines in FIG. 4, such a configuration may be included in which the projection protrudes extensively toward the lower (or upper) separator 3. In this case, when configuring the fuel cell stack, a projection 11 will be engaged with the periphery portions of manifold holes H2, H5 of the own separator 3 as well as the periphery portions of manifold holes H2, H5 of lower separator 3 (shown in phantom line) adjacent to the own separator.

In addition, although the projection 11 may be provided on at least a portion of the periphery of the manifold hole, if provided around the entire periphery of the manifold hole, when structuring a the fuel cell stack, a continuous flow passage is formed in the stacking direction. In this case, as shown in FIG. 5A, a part of upper side may be omitted, or, as shown in FIG. 5B, a part of lower side may be removed.

In other words, manifold holes H1 to H6 are assumed to supply to or discharge from generation unit G of reactant gas or cooling fluid, a portion of the relevant projection 11 may be partially omitted or so mold processed, so that reactant gas or cooling fluid may be distributed between the associated layers. As an example, in the interlayer between MEA 2 and separator 3 disposed on the fuel electrode side, projection 11 of manifold holes H1, H4 for fuel gas supply and exit may be provided with a cutout or through hole for circulating fuel gas.

As mentioned above, in the configuration in which a flow path is formed by continuous arrangement of projection 11 and a cutout or through hole is provided on projection 11 at a predetermined portion, a diffuser function may further be accompanied to the cutout or through hole disposed at entrance. This makes it possible to abolish or reduce the diffuser section between the power generation unit and the manifold section, but it also achieves a further reduction in size and weight of fuel cell FC. Therefore, the fuel cell stack composed of a laminate of such a fuel cell FC is more compact and extremely suitable for small fuel cell to moveable body.

Furthermore, by forming a flow path with a continuous extension of projection 11 for along the stacking direction as described above, the unevenness in the flow path between layers will be eliminated to significantly reduce the amount of remaining water. In addition, in the path of the cooling fluid, in particular, a continuous flow path in the stacking direction and between adjacent separators 3, 3 in a stacked state are filled with cooling fluid. In this instance, because of a presence of intervening projection 11 as an integral part of frame 1 between cooling fluid (refrigerant) and end face of separator, fluid flow resistance will increase and the leakage current flowing between the end face of separator and another separate separator 3 may be smaller. Thus, resulting in a separator corrosion rate being suppressed due to the leakage current out of the end face.

According to a fuel cell FC of the present invention, as a more preferred embodiment, as shown in FIG. 6, the contour line that bounds the projection 21 and being concentric with manifold holes H1 to H6 of frame 1 may be configured to be located outside of the contour lines of manifold holes H1 to H6 of separator 3. In other words, the dimension or diameter (a) of the contour line that bounds the projection 21 is greater than that of manifold holes H1 to H6 of separator 3 (i.e. a>b).

In other words, the projection 21 making up the periphery portion of manifold holes H1 to H6 of frame 1 is at least in part located outside the periphery portion of manifold holes H1 to H6 of separator 3. In addition, as shown in FIG. 7, in case of having separate or divided projections 21 for some manifold holes H1 and H6, the dimensions of the contour (a) bounding all the projections 21 are set larger than the dimensions (b) of manifold holes H1, H6.

In addition, the projections 21 shown in FIG. 6, passes through manifold holes H1 to H6 and is formed with hooked shape at both the upper and lower side thereof for engagement.

Figure 8:
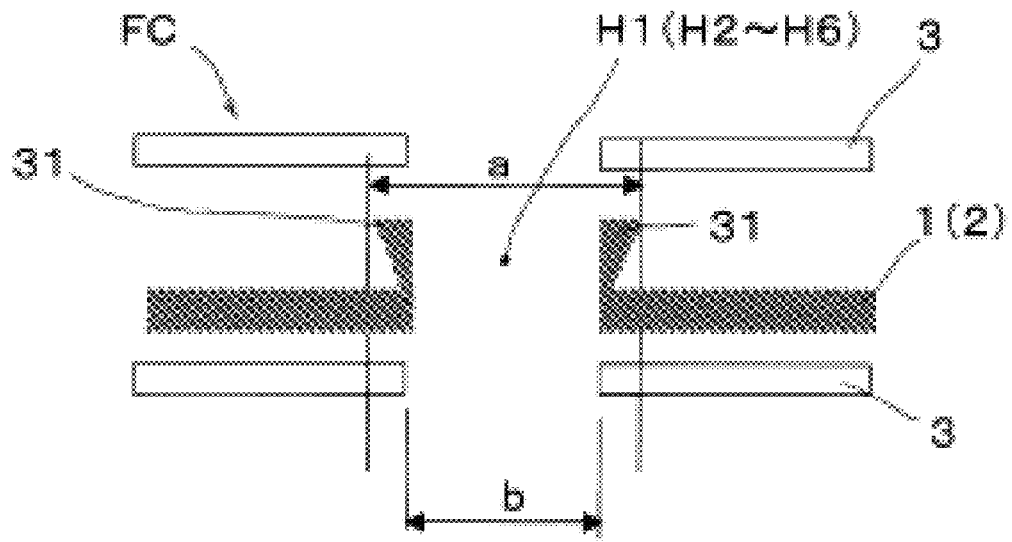
FIG. 8 is a cross-sectional view in a disassembled state of the projection according to the still other embodiment.
Figure 9:
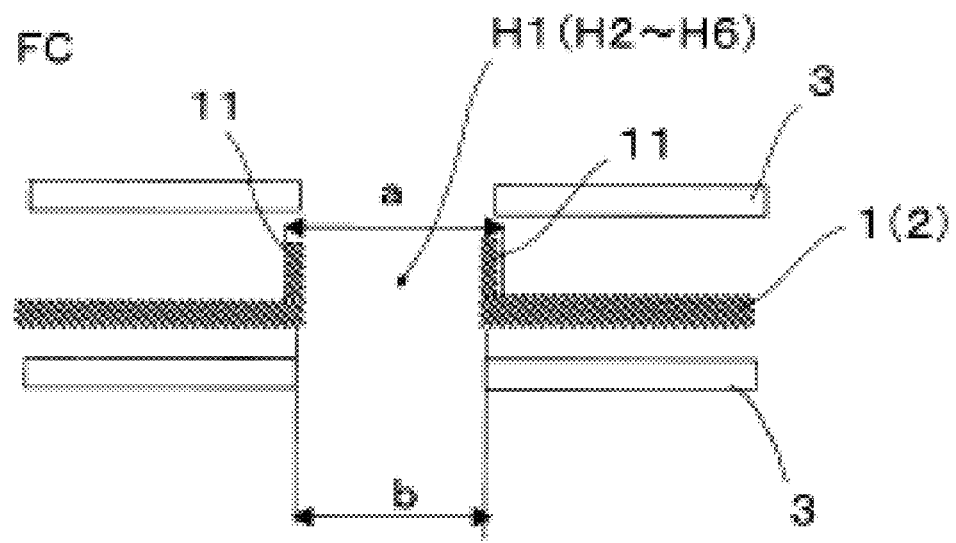
FIG. 9 is a cross-sectional view in a disassembled state of the projection according to the still other embodiment.

In addition, as shown in FIG. 8, the projections 31 forms a reverse triangular cross section, also in this case, to achieve the locking state after passing through the manifold holes H1 to H6 of separator 3. Moreover the projection 11 is formed in a similar fashion as those illustrated in FIGS. 4 and 5.

In the fuel cell FC fuel cell provided with the structure mentioned above, the projections 11 to 31 are engaged with the elastic deformation with manifold holes H1 to H6 of separator 3. In addition, the projections 21, 31 shown in FIGS. 6 and 8 are engaged and fixed to manifold holes H1 to H6 with elastic deformation. This makes it possible to position both separators 3, 3 to frame 1 and MEA 2 easily and reliably, without using other parts for integrated assembly of both entities.

Figure 10:
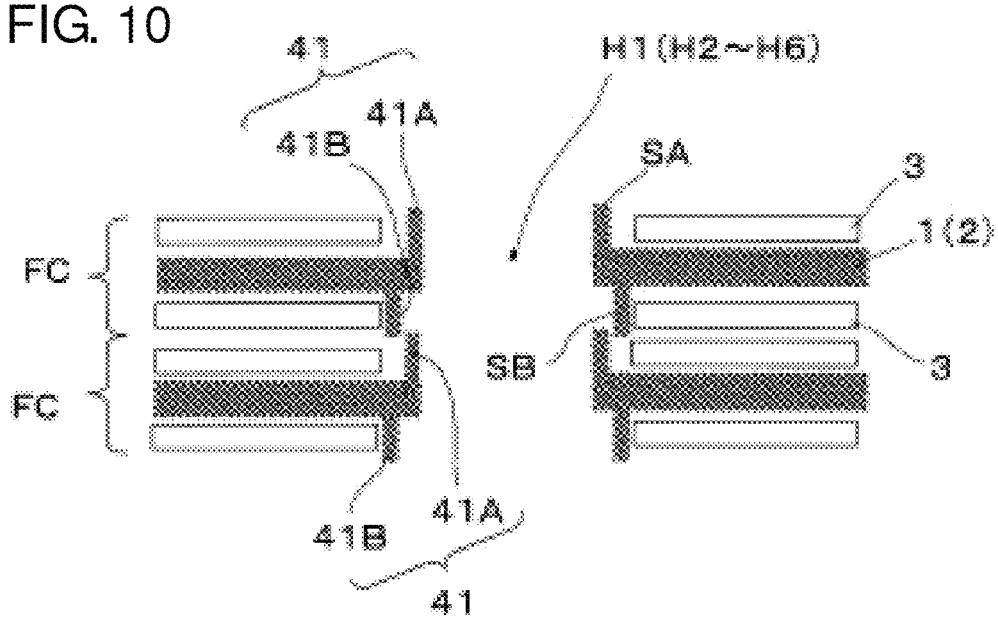
FIG. 10 is a cross-sectional view of the projection according to the still other embodiment.
Figure 11:
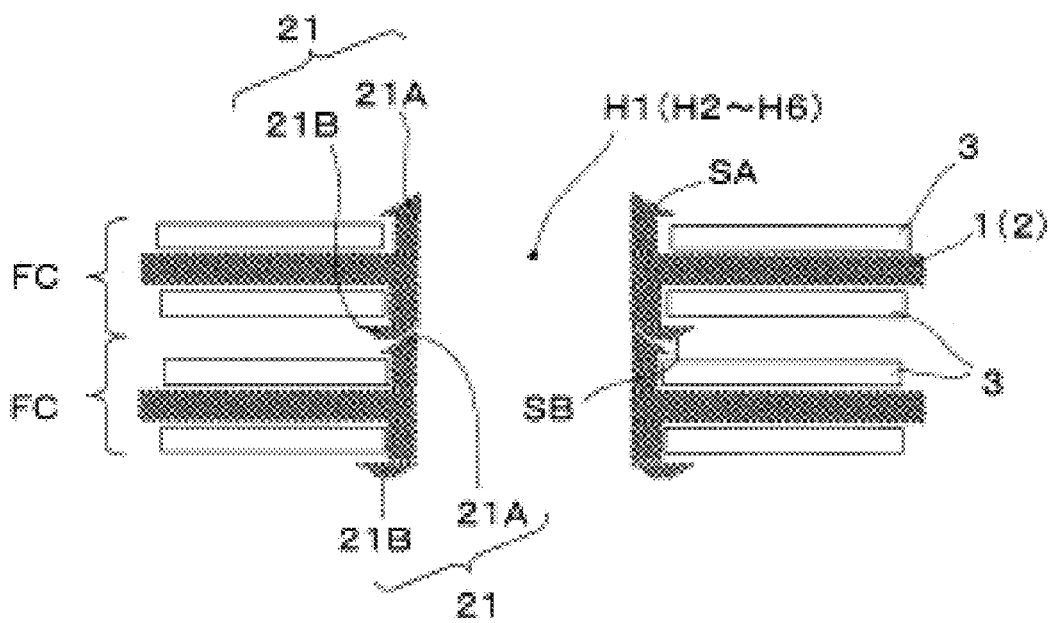
FIG. 11 is a cross-sectional view of the projection according to the still other embodiment.

According to the fuel cell FC of the present invention, the projection making up the periphery portion of manifold holes H1 to H6 of frame 1 may be configure to have junctions on both anode side on an fuel cell and cathode side on anther, adjacent cell, which abut against each other when a plurality of fuel cells are stacked. That is, when configuring the fuel cell stack, projections of each fuel cell FC form a continuous flow path. FIGS. 10 and 11 show the examples.

In the fuel cell shown in FIG. 10, the projection 41 has an upper projection 41A protruding to the anode side and a lower projection 41B protruding to the cathode side. The upper projection 41A and lower projection 41 are staggered to each other in a radial direction of manifold holes H1 to H6 to form a step. In addition, the upper projection 41 forms a gap between its tip or a upper junction portion SA and the periphery portion of manifold holes H1 to H6 of separator while the upper projection 41 forms a lower junction portion SB with its tip.

In the fuel cell FC described above, when configuring a fuel cell stack by stacking, the lower junction portion SB of the projection 41 of the upper fuel cell FC is brought in engagement with the upper junction portion SA of projection 41 of the lower fuel cell FC. This makes it possible, when configuring the fuel cell stack, positioning and integration of fuel cells FC will be made very easy to achieve a further improvement of production efficiency and reduction of man-hours.

In the fuel cell FC shown in FIG. 11, the projection 21 has a hook-shaped, upper projection 21A protruding to the anode side and a lower, equally hook-shaped projection 21B projecting to the cathode side. The upper projection 21A has an inclined surface in its cross section directing outwardly of manifold holes H1 to H6 and this inclined surface is made the upper junction portion SA. On the other hand, the lower projection 21B has an inclined surface oriented inwardly of manifold holes H1 to H6 in its cross section and forms this inclined surface as the lower junction portion SB.

In the fuel cell FC described above, when configuring a fuel cell stack by stacking, the lower junction portion SB of the projection 41 of the upper fuel cell FC is brought in engagement with the upper junction portion SA of projection 41 of the lower fuel cell FC. This makes it possible, when configuring the fuel cell stack, positioning and integration of fuel cells FC will be made very easy to achieve a further improvement of production efficiency and reduction of man-hours.

According to the fuel cell FC of the present invention, in a more preferred embodiment, the projection forming the periphery portion of manifold holes H1 to H6 of frame 1 does not only have junction portions on both anode and cathode sides, but also uneven shape for mutual engagement there between. Concrete examples are shown in in FIG. 12 and FIG. 13.

Figure 12:
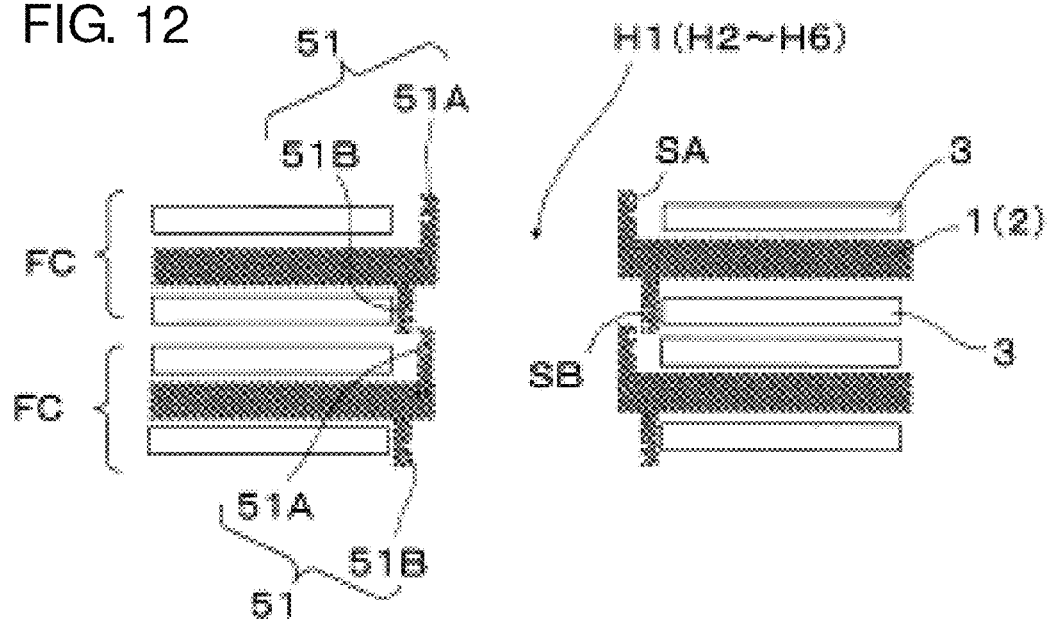
FIG. 12 is a cross-sectional view of the projection according to the still other embodiment

In the fuel cell FC shown in FIG. 12, projection 51 has an upper projection 51A projecting to anode side as well as a lower projection 51B projecting to cathode side, as in the example shown in FIG. 10. The upper projection 41 has a distal end portion with an uneven shaped, upper junction portion SA directing outward of manifold holes H1 to H6. On the other hand, the upper projection 41 has a distal end portion with an uneven-shaped, lower junction portion SB oriented inwardly of manifold holes H1 to H6.

In the fuel cell FC described above, when configuring a fuel cell stack by stacking, the uneven-shaped, lower junction portion SB of the projection 41 of the upper fuel cell FC is brought in engagement with the uneven-shaped, upper junction portion SA of projection 41 of the lower fuel cell FC. This makes it possible, when configuring the fuel cell stack, positioning and integration of fuel cells FC will be made very easy while ensuring an even stronger state of engagement.

Figure 13:
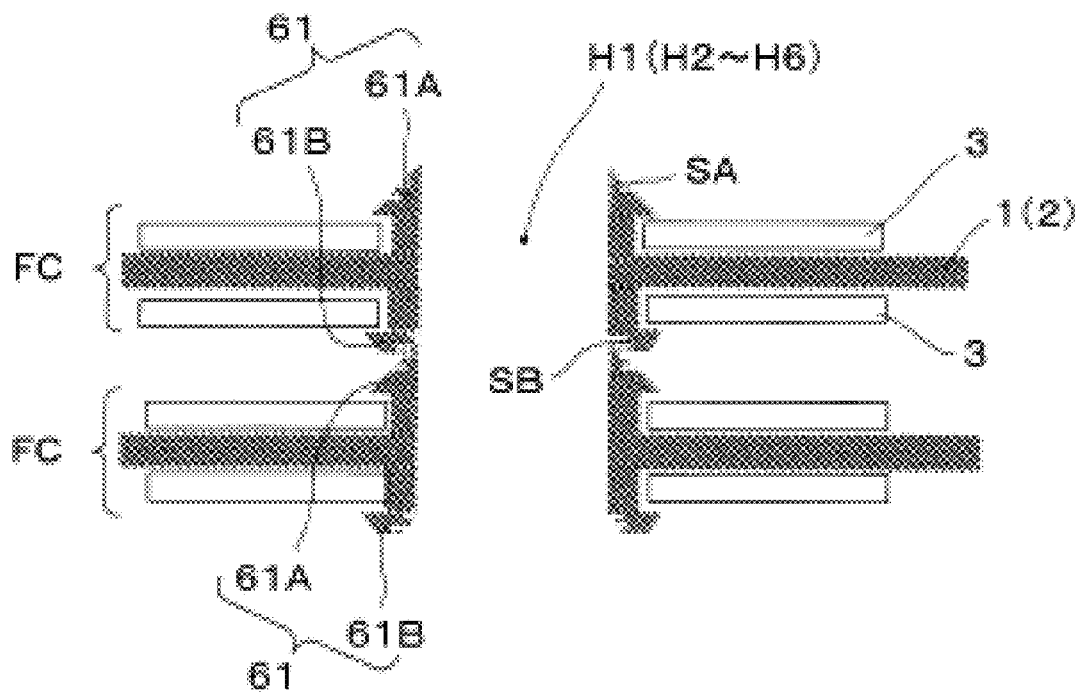
FIG. 13 is a cross-sectional view of the projection according to the still other embodiment.

In the fuel cell FC shown in FIG. 13, similar to those shown in FIG. 11, projection 61 has a hook-shaped, upper projection 61A projecting to anode side and an equally hook-shaped, lower projection 61B projecting to cathode side. The upper projection 21A has an inclined surface directing outwardly of manifold holes H1 to H6 in its cross section with part of the inclined surface shaped uneven or with irregularities to form an upper junction portion SQ including this uneven part. On the other hand, the lower projection 21B has an inclined surface oriented inward of manifold holes H1 to H6 in its cross section with part of the inclined surface shaped uneven to form a lower junction portion SB including the uneven part.

In the fuel cell FC described above, when configuring a fuel cell stack by stacking, the lower junction portion SB of the projection 41 of the upper fuel cell FC is brought in abutment engagement with the upper junction portion SA of projection 41 of the lower fuel cell FC. This makes it possible, when configuring the fuel cell stack, positioning and integration of fuel cells FC will be made very easy while ensuring even stronger state of engagement between projections 51.

Cell FC fuel cell described above, when you configure the fuel cell stack by stacking, it takes into contact with SA joint top in the cell FC fuel cell of the lower side, the SB junction lower in the cell FC fuel cell of the upper that case. Thus, when you configure the fuel cell stack, on the positioning and integration of fuel cell FC between cells is facilitated, the state of engagement between the positioning projections 51 and will be stronger.

According to the fuel cell FC of the present invention, in a more preferred embodiment, the projection forming the periphery portion of manifold holes H1 to H6 of frame 1 does has junction portions on both anode and cathode sides. In addition, as shown in FIG. 13, one of the junction portions has an inclined surface directed inwardly of manifold hole while the other junction portion has an outwardly oriented, inclined surface relative to manifold hole with flexibility in an inward and outward direction relative to manifold hole. In the illustrated example, one junction portion presents the upper junction portion SA while the other the lower junction portion SB.

In the fuel cell FC described above, when configuring a fuel cell stack by stacking, the lower junction portion SB of upper fuel cell FC will be in contact engagement with the upper junction portion SA of lower fuel cell FC. In this instance, as shown in FIGS. 14 and 15, the amount of deflection in the stacking direction can be appropriately selected.

Figure 14A:
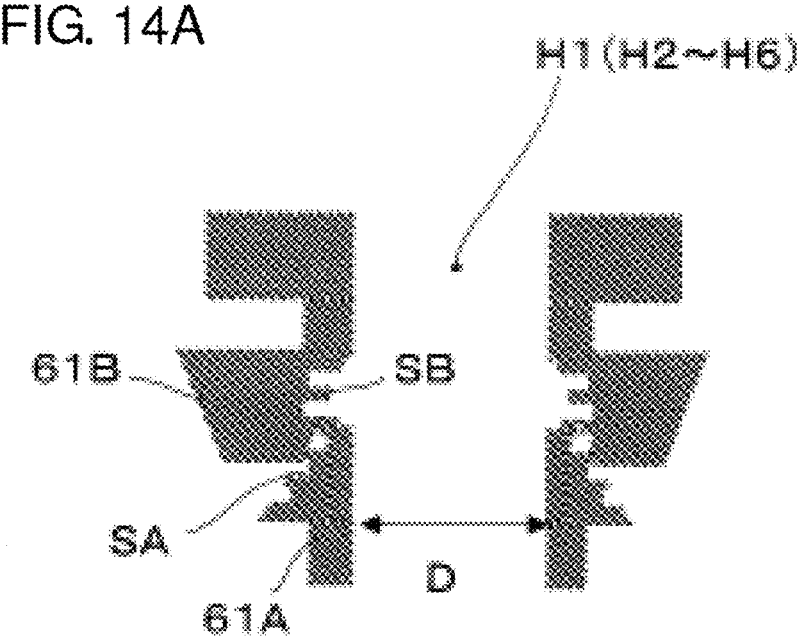
FIGS. 14A and 14B show a diagram illustrating a tip portion of the projection in a shallow engagement state and in a deep engagement state, respectively.

In the projection 61 shown in FIG. 14A, lower projection 61B forms an inclined surface at its lower junction portion SB with uneven shape or irregularities and the height of protrusion grows sequentially from the top through the bottom side. In contrast, the upper projection 61A has an inclined surface with uneven shape or irregularities at its upper junction portion SA and the depth of the recess is smaller sequentially from the top through the bottom side.

Figure 15A:
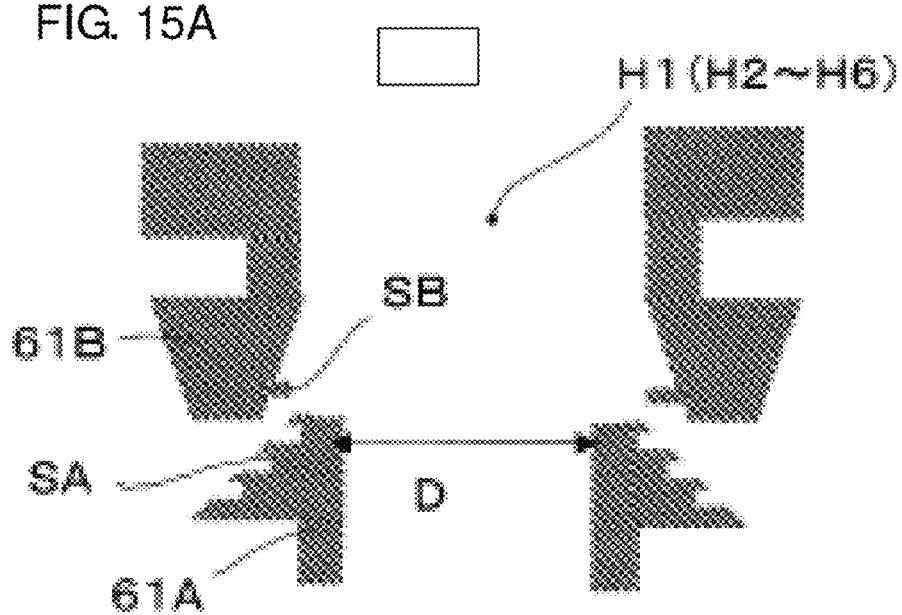
FIGS. 15A and 15B are cross-sectional views showing a diagram illustrating a tip portion of the projection in a shallow engagement state and in a deep engagement state, respectively.

In addition, in the projection 61 shown in FIG. 15A, both the upper projection 61A and lower projection 61B have, at their respective upper junction portions SA and SB, an inclined surface with uneven, i.e. protrusion and recess formed shape while having a predetermined difference in the inclination angles of ($\theta$).

Figure 14B:
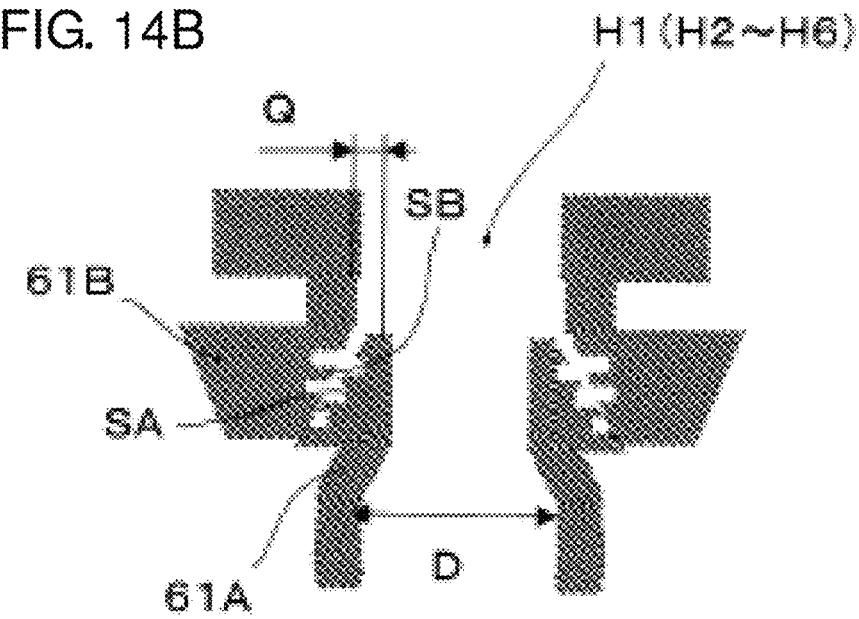
Figure 15B:
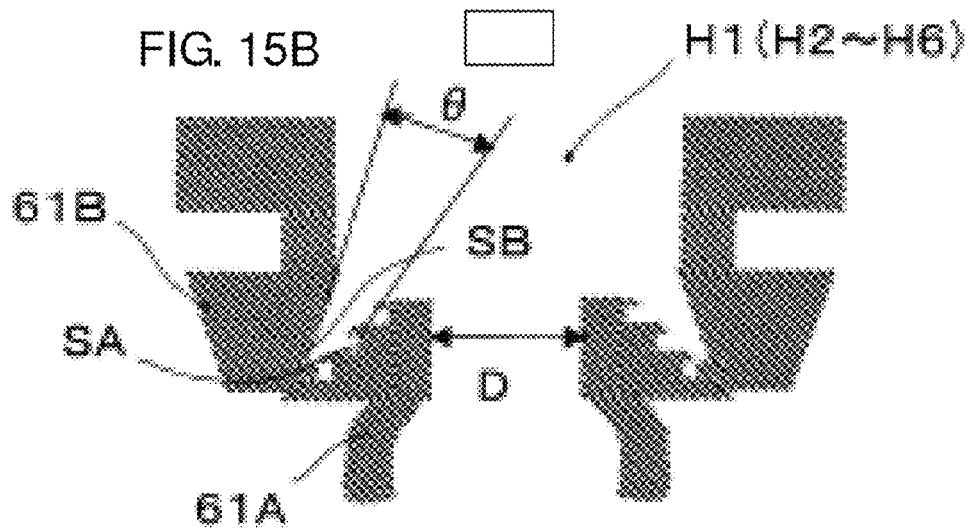

According to projection 61 above mentioned, when configuring a fuel cell stack, if the amount of indentation or deflection is increased in the stacking direction, as shown in FIG. 14B and FIG. 15B, the tip of the flexible upper projection 61A will deflect inwardly of manifold holes H1 to H6.

According to the fuel cell FC having the structure mentioned above, when configuring a fuel cell stack, it is possible to obtain similar implementation and effect as those of the previous embodiment, and moreover, by adjusting the amount of deflection in the stacking direction, it is further possible to change the size of flow path (cross sectional area) D formed inside of projection 61 due to increase or decrease of displacement amount of upper projection 61A relative to manifold holes H1 to H6.

In other words, in a fuel cell stack, in manifold part, while reactant gas flow is introduced in the stacking direction, the reactant gas will be further supplied to individual fuel cell FC. Thus, there may be a difference in flow rate or flow velocity of reactant gas between the upper side and lower side. Accordingly, as mentioned above, by changing the displacement amount of upper projection 61A partially to change the size of flow path partially, is may be possible to obtain a uniform flow rate or flow velocity of reactant gas in the stacking direction, which may also contribute to improve the performance of fuel cell. Moreover, differentiating of height of protrusion or depth of recess of the uneven or irregular part may make the range of displacement of upper projection 61A (displacement amount Q) larger.

Figure 16:
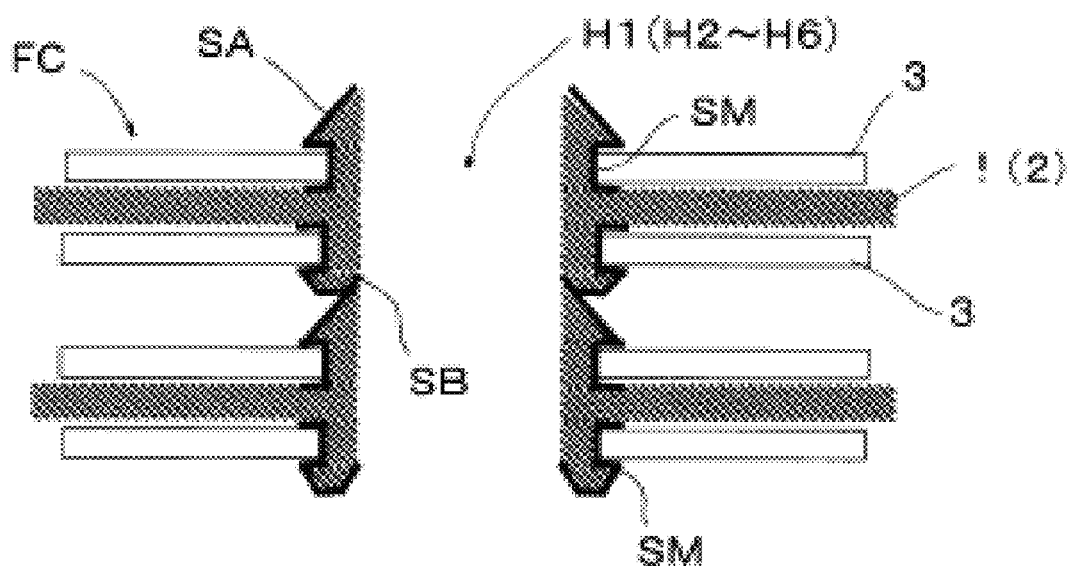
FIG. 16 is a cross-sectional view of the projection according to still another embodiment.

According to the fuel cell FC of the present invention, a more preferred embodiment, is shown in FIG. 16. Respective junction portions SA, SB of projection 21 and place of contact with separator 3 may be coated with seal material SM indicated in bold. Note that the seal material SM may be alternatively coated over the entire surface in view of production efficiency.

In the fuel cell FC with the structure mentioned above, when frame 1 and MEA 2 are superimposed or stacked on the both separators 3, it is possible to obtain similar implementation and effect of each embodiment above, thanks to seal material SM to cover the contact portion with separator 3, it is possible to further enhance the sealing function to the reaction gas.

In addition, in the fuel cell FC described above, when configuring a fuel cell stack by stacking multiple fuel cells, due to seal material SM covering or coating the surface of each junction portion SA, SB, it is possible to further enhance adhesion between neighboring projections 21 and improve sealing function against oxidant gas and cooling fluid. It should be noted that the seal material SM may be applied to projection of each of the embodiments shown in FIGS. 4 to 6, and in FIGS. 8 to 16.

In addition, in the fuel cell according to the present invention, the structure or configuration is not intended to be limited to each of the above embodiment, but, as long as within the range without departing from the gist of the present invention, shape, the number, material and the like of respective component parts may be changed depending upon specific application.

The invention claimed is:

1. A fuel cell comprising:
a membrane-electrode-assembly having a stack direction;
a frame body positioned around a periphery of the membrane-electrode-assembly, the frame body having frame manifold holes extending completely through the frame body in the stack direction; and
a pair of separators sandwiching the frame body and the membrane-electrode-assembly in the stack direction, wherein:
each of the pair of separators has separator manifold holes extending therethrough in the stack direction;
each of the pair of separators has a structure for circulating reactant gas between the frame body and the separators; and
a positioning projection extends from opposing surfaces of the frame body from an inner peripheral edge of at least two frame manifold holes, each positioning projection having:
an anode side portion projecting completely through an adjacent separator manifold hole of one of the pair of separators and covering an inner peripheral surface of the adjacent separator manifold hole; and
a cathode side portion projecting completely through an adjacent separator manifold hole of another of the pair of separators and covering an inner peripheral surface of the adjacent separator manifold hole of the other of the pair of separators;
wherein the anode side portions of each positioning projection are aligned in the stack direction, the cathode side portions of each positioning projection are aligned in the stack direction, and the adjacent separator manifold holes of the pair of separators are aligned in the stack direction.

2. The fuel cell as claimed in claim 1, wherein the anode side portion and the cathode side portion of the positioning projection each extends at an angle from opposing surfaces of the frame body.

3. The fuel cell as claimed in claim 1, wherein both the anode side portion and the cathode side portion of the positioning projection extend from an entire periphery of the at least two frame manifold holes such that the inner periphery surface of each of the adjacent separator manifold holes is separated from a fluid flowing through the separator manifold holes, thereby preventing corrosion of the pair of separators.

4. The fuel cell as claimed in claim 1, wherein one of the anode side portion and the cathode side portion extends from an entire periphery of the at least two frame manifold holes and the other of the anode side portion and the cathode side portion extends from a portion of the periphery of the at least two frame manifold holes, thereby providing an opening through which fluid is distributed between the membrane-electrode-assembly and an adjacent separator.

5. The fuel cell as claimed in claim 1, wherein a contour line coaxial with the frame manifold hole and bounding the positioning projection is located outwardly of a contour line of the separator manifold hole.

6. The fuel cell as claimed in claim 1, wherein the anode side portion and the cathode side portion of the positioning projection are hook-shaped for engagement with the inner periphery of the adjacent separator manifold hole after passing through the adjacent separator manifold hole.

7. The fuel cell as claimed in claim 2, wherein each of the anode side portion and the cathode side portion of the positioning projection comprises junction portions for mutual abutment between adjacent fuel cells when stacking a plurality of the fuel cells.

8. The fuel cell as claimed in claim 7, wherein the junction portions of the positioning projection have a first shape on the anode side portion and a second shape on the cathode side portion, the first and second shapes configured for mutual engagement there between.

9. The fuel cell as claimed in claim 8, wherein the junction portion on one of the anode side portion and the cathode side portion has an inwardly directing, inclined surface relative to the frame manifold hole while the junction portion of another of the anode side portion and the cathode side portion has an outwardly oriented, inclined surface relative to the frame manifold hole with a flexibility in inward and outward direction thereof.

10. The fuel cell as claimed in claim 7, wherein a surface of each junction portion of the positioning projection is coated with seal material.

11. The fuel cell as claimed in claim 1, wherein a contact area between the positioning projection and the adjacent separator is coated with seal material.

12. The fuel cell as claimed in claim 1, wherein the positioning projection is integrated with the frame by a resin molding.

13. A fuel cell stack composed by stacking a plurality of the fuel cells described in claim 2.

* * * * *